Patented Feb. 13, 1951

2,541,011

UNITED STATES PATENT OFFICE 2,541,011

TERNARY INTERPOLYMERS COMPRISING ACRYLONITRILE AND FUMARIC ACID

John R. Caldwell, Kingsport, Tenn., assignor to Eastman Kodak Company, Rochester, N. Y., a corporation of New Jersey No Drawing. Application February 8, 1950, Serial No. 143,154

13 Claims. (Cl. 260—78.5)

This invention relates to ternary interpolymers containing acrylonitrile, fumaric acid, and a third component selected from the group consisting of vinyl acetate and methyl acrylate. More particularly, this invention relates to ternary interpolymers from which fibers having a high softening point, and which can be readily dyed, can be obtained.

Acrylonitrile has previously been used in the preparation of various polymers which are characterized by insolubility, or very low solubility, in many of the usual organic solvents. Many of these polymers, especially those containing high percentages of acrylonitrile, are further characterized by their lack of susceptibility to organic dyes, it being well known that fibers spun from polyacrylonitrile solutions can be passed through dye baths without material amounts of the dye adhering to the fiber.

Attempts have been made to increase the dyeability of acrylonitrile fibers by interpolymerizing acrylonitrile with certain monomers whose polymers have an affinity for dyes. While this procedure does give polymer products from which fibers having good dyeing properties can be obtained, a serious drawback arises in certain instances due to a substantial lowering of the softening point of the fiber. For example, while an interpolymer of acrylonitrile and acrylic acid containing about 80% by weight of acrylonitrile and 20% by weight of acrylic acid in the polymer molecule, can be drawn into fibers readily susceptible to dyes, the softening point of such fibers is too low for practical purposes, softening of the fibers being observed at about 150°–170° C.

I have now found that polymers of acrylonitrile can be obtained which are suitable for the spinning of fibers having a high softening point, and which in addition, are readily susceptible to dyeing.

It is, therefore, an object of my invention to provide new ternary interpolymers comprising acrylonitrile, fumaric acid, and methyl acrylate or vinyl acetate. A further object is to provide a process for preparing such polymers. Still another object is to provide fibers obtained from these polymers which have a high softening point and are readily susceptible to dyeing. Another object is to provide a method for preparing fibers from the ternary interpolymers of my invention. Other objects will become apparent from a consideration of the following description and examples.

According to my invention, I prepare new ternary interpolymers containing acrylonitrile, fumaric acid, and methyl acrylate or vinyl acetate by polymerizing in the presence of a polymerization catalyst, a mixture consisting of from 45 to 85% by weight of acrylonitrile, from 8 to 20% by weight of fumaric acid, and from 5 to 30% by weight of a vinyl compound selected from the group consisting of vinyl acetate and methyl acrylate.

While ternary interpolymers comprising acrylonitrile and esters of fumaric or maleic acids have previously been described in the prior art, I have found that these interpolymers are not suitable for the purposes of my invention. Fibers obtained from the esters of fumaric acid are not readily susceptible to vat or direct dyes by the methods usually employed in the art. I have further found that polymers containing less than about 8% by weight of fumaric acid cannot be dyed satisfactorily by vat dyes, while polymers containing more than about 20% by weight of fumaric acid have the undesirable properties of softening excessively in soap solutions. It is, therefore, apparent that the range of 8 to 20% by weight of fumaric acid set forth above is critical for the purposes of my invention.

Since acrylic acid, when interpolymerized with acrylonitrile, gives interpolymers whose fibers soften materially lower than the softening point of polyacrylonitrile fibers, it was most unexpected to find that ternary polymers containing from about 8 to 20% by weight of fumaric acid gave fibers which exhibited a softening point about the same as that of polyacrylonitrile fibers. Further, I have found that maleic acid does not function in the same manner as fumaric acid in the polymers of my invention. Attempts were made to substitute equivalent amounts of maleic acid in the ternary interpolymers of my invention, however, it was found that fibers prepared from these polymers melted from 25° to 50° C. lower than the fibers prepared according to the present invention, which generally soften at about 200° C., or higher. No reference has been found in the prior art showing polymers of acrylonitrile suitable for spinning into fibers having such a high softening point, as well as excellent dyeing properties.

Useful polymerization catalysts which can advantageously be employed in my invention include the organic peroxide polymerization catalysts, such as acetyl peroxide, benzoyl peroxide, acetyl benzoyl peroxide, lauroyl peroxide, t-butyl hydroperoxide, urea peroxide, triacetone peroxide, etc.; inorganic peroxide polymerization catalysts, such as the persulfates (e. g. the alkali metal persulfates, such as sodium, potassium, etc.

persulfates, and ammonium persulfate, etc.), the perborates (e. g., alkali metal perborates, such as sodium and potassium perborates, etc.), hydrogen peroxide, etc. The alkali metal persulfates have been found to be especially useful for the purposes of my invention.

The polymerization can also be carried out in the presence of actinic light, ultra-violet radiation, etc. When it is preferred to use energy of this type from external sources, peroxide polymerization catalysts can be added in small amounts, if desired.

The amount of polymerization catalyst used can be varied, depending on the particular composition being polymerized, the proportions of monomers in the mixture, the presence or absence of heat, etc. Generally from 0.05% to 3% by weight, based on the total weight of monomers in the mixture, of catalyst can be used, although I have found that from 0.1 to 0.5% by weight of catalyst is especially useful in practicing the process of my invention.

Heat accelerates the polymerization, and temperatures varying from 20° to 100° C. have been found to be useful. A more limited temperature range which can be used is from 45° to 70° C., while especially good results have been obtained in the cases where the polymerization was carried out at a temperature of from 50° to 60° C. Lower or higher temperatures can be used, if desired, although I have found that the polymerization temperature has an effect on the molecular weight of the polymer produced, which, in turn, affects the solubility of the polymer in the solvents generally employed for the wet-spinning of fibers.

The polymerization can advantageously be carried out by any of the methods generally employed in the art. Polymerization by an emulsion or dispersion method in water has been found to be useful. In some cases, it is not necessary to employ emulsifying or dispersing agents, although substances which lower the solubility of the monomeric materials used can be added to the polymerization mixture prior to, or during the polymerization. The reactants are then agitated to distribute evenly the heat liberated in the polymerization reaction. Using such emulsion or dispersion methods gives the new ternary interpolymers of my invention, which separate from the reaction medium as they are formed. The polymerization can also be carried out by solution methods, it generally being preferred to select a solvent which has dissolving power for the monomers, but substantially none for the polymers, so that the polymer separates from the reaction medium as it is formed.

In an emulsion or dispersion method of polymerization emulsifying agents can be added to the polymerization medium, if desired. Suitable emulsifying agents include the usual emulsifying agents, and certain agents which are more generally referred to as granulating agents. Substances which can be added to the polymerization medium to lower the solubility of the monomers in the medium include such agents as sulfonated mineral oil, fatty alcohol sulfates, e. g., sodium lauryl sulfate, aromatic sulfonates, e. g., the alkali metal salts of aromatic sulfonic acids, such as sodium isobutylnaphthalenesulfonate, polyethylene glycols, polyvinyl alcohol, partially hydrolyzed polyvinyl acetate, methyl cellulose, starch, methylated starch, etc.

The new ternary interpolymers of my invention can be dissolved in the organic solvents known to have a dissolving power for polyacrylonitrile or interpolymers containing large percentages of acrylonitrile, such as N,N-dimethylformamide, N,N-dimethylacetamide, γ-valerolactone, γ-butyrolactone, ethylene cyanohydrin, ethylene carbamate, succinonitrile, N-formylmorpholine, N-formylpyrrolidone, N-methylpyrrolidone, N-formylpiperidine, N,N-dimethylmethoxyacetamide, etc. Also useful for dissolving the new interpolymers of my invention are solvents such as, for example, those containing two parts of acetonitrile and one part of N,N-dimethylformamide, or two parts of acetonitrile and one part of γ-valerolactone, etc. The solutions of my new interpolymers can be spun into fibers by any of the well-known, wet-spinning processes, such as that set forth in Latham U. S. Patent 2,404,714, dated July 23, 1946. The fibers prepared from the polymers of my invention, according to the method of the above patent, have excellent strength and elasticity. These fibers can be readily dyed by cellulose acetate dyes, vat dyes, etc. These fibers also have a high softening point, and, in general, soften at a temperature of above 200° C.

The new ternary interpolymers of my invention can also be used in the manufacture of films, molded objects, tapes, adhesive compositions, etc.

The following examples illustrate the preparation of some of the more useful interpolymers which can be prepared according to my invention.

*Example 1*

74 g. of acrylonitrile, 10 g. of methyl acrylate and 16 g. of fumaric acid were placed in a flask containing 400 cc. of water. To this mixture, there were added 2 g. of sulfonated mineral oil, 2 g. of sodium dioctyl sulfosuccinate and 0.2 g. of potassium persulfate. The flask was then sealed and tumbled end-over-end in a water bath which was heated to 50° C. At the end of 24 hours, the tumbling was stopped and the emulsion was coagulated by the addition of sodium sulfate. The precipitated resin was washed and dried to give a 90% yield of polymer. The polymer was found to be soluble in a mixture of two parts by weight of acetonitrile and one part of N,N-dimethylformamide.

Fibers spun from solutions of the above polymer had a strength of 3.5 grams per denier and an elongation of 18% after drafting 400%. The fibers so prepared were heated at 180°–200° C. for two minutes, but softening was not observed. Heating was continued until a temperature of 220° C. was reached, however, at this point no softening could be detected. The fiber showed a water-shrink of less than 10%, and it was readily susceptible to dyeing with vat dyes or cellulose acetate dyes.

*Example 2*

74 g. of acrylonitrile, 10 g. of vinyl acetate, and 16 g. of fumaric acid were placed in a flask containing 400 cc. of water, to the mixture there were added 2 g. of sulfonated mineral oil, 2 g. of sodium dodecyl sulfate, and 0.2 g. of potassium persulfate. The flask was then stoppered and tumbled end-over-end in a water bath at 55° C. for 20 hours. The resulting emulsion was coagulated with sodium sulfate, and the supernatant liquid decanted from the precipitated resin. The resin was washed and dried to give a yield of 85% of the theoretical. It was found to be soluble in a mixture of one part of acetonitrile and one part by weight of N,N-dimethylformamide.

Fibers spun from the above solution had a strength of 3.5-3.7 grams per denier and an elongation of 18% after drafting. They showed a softening point above 250° C.

*Example 3*

60 g. of acrylonitrile, 24 g. of methyl acrylate and 16 g. of fumaric acid were placed in a glass bottle containing 600 cc. of water. While the mixture was stirred, 0.4 g. of potassium persulfate, 0.2 g. of sodium bisulfite and 5 g. of polyethylene glycol were added. The mixture was continuously stirred at 50°-60° C. in a water bath for 8 hours. The yield of polymer was 95 g., or 95% of the theoretical. The resulting polymer was soluble in N,N-dimethylacetamide and was converted into yarn having a strength of 3-4 grams per denier.

*Example 4*

80 g. of acrylonitrile, 10 g. of vinyl acetate, and 10 g. of fumaric acid were placed in a round-bottom flask containing 1000 cc. of water. There were then added 1.2 g. of potassium persulfate and 0.8 g. of sodium bisulfite. The air above the mixture was exhausted and replaced by an atmosphere of nitrogen. The closed flask was agitated at 55°-60° C. for 16 hours. The precipitated resin was filtered, washed and dried to give a yield of 90 g. It was soluble in $\gamma$-butyrolactone, and fibers spun from the lactone solution had a softening point of 220° C. They could be dyed with vat dyes.

*Example 5*

82 g. of acrylonitrile, 10 g. of vinyl acetate, and 8 g. of fumaric acid were suspended in 1000 cc. of water. There were then added 1.5 g. of ammonium persulfate. The mixture was then stirred at 65° C. for 10 hours, at the end of which time 92 g. of polymer were obtained. The polymer was soluble in N,N-dimethylformamide and fibers spun from this solution softened above 230° C.

*Example 6*

50 g. of acrylonitrile, 30 g. of methyl acrylate, and 20 g. of fumaric acid were dispersed in 1200 cc. of water. To the dispersion 1.2 g. of potassium persulfate were added, and the mixture was stirred at 55°-60° C. for 18 hours, at the end of which time an 85% yield of polymer was obtained. The polymer could be dissolved in $\gamma$-valerolactone to give solutions suitable for spinning of the fibers.

The compositions obtained in the above examples closely parallel that of the monomeric mixtures from which they are prepared. Of course, the compositions of the interpolymers can be varied by shortening the period of heating, using higher or lower temperatures of polymerization, etc. As noted above, polymers containing less than 8%, or more than 20%, by weight of fumaric acid are not useful for the purposes of my invention.

What I claim as my invention and desire secured by Letters Patent of the United States is:

1. A ternary interpolymer containing in the polymer molecule from 45 to 85 per cent by weight of acrylonitrile, from 8 to 20 per cent by weight of fumaric acid, and from 5 to 30 per cent by weight of a vinyl compound selected from the group consisting of vinyl acetate and methyl acrylate.

2. A ternary interpolymer containing in the polymer molecule from 45 to 85 per cent by weight of acrylonitrile, from 8 to 20 per cent by weight of fumaric acid, and from 5 to 30 per cent by weight of methyl acrylate.

3. A ternary interpolymer containing in the polymer molecule from 45 to 85 per cent by weight of acrylonitrile, from 8 to 20 per cent by weight of fumaric acid, and from 5 to 30 per cent by weight of vinyl acetate.

4. A ternary interpolymer containing in the polymer molecule 74 per cent by weight of acrylonitrile, 16 per cent by weight of fumaric acid, and 10 per cent by weight of methyl acrylate.

5. A ternary interpolymer containing in the polymer molecule 74 per cent by weight of acrylonitrile, 16 per cent by weight of fumaric acid, and 10 per cent by weight of vinyl acetate.

6. A ternary interpolymer containing in the polymer molecule 60 per cent by weight of acrylonitrile, 16 per cent by weight of fumaric acid, and 24 per cent by weight of methyl acrylate.

7. A ternary interpolymer containing in the polymer molecule 80 per cent by weight of acrylonitrile, 10 per cent by weight of fumaric acid, and 10 per cent by weight of vinyl acetate.

8. A ternary interpolymer containing in the polymer molecule 50 per cent by weight of acrylonitrile, 20 per cent by weight of fumaric acid, and 30 per cent by weight of methyl acrylate.

9. A process for preparing a ternary interpolymer comprising polymerizing in the presence of a peroxide polymerization catalyst a mixture consisting of from 45 to 85 per cent by weight of acrylonitrile, from 8 to 20 per cent by weight of fumaric acid, and from 5 to 30 per cent by weight of a vinyl compound selected from the group consisting of vinyl acetate and methyl acrylate.

10. A process for preparing a ternary interpolymer comprising polymerizing in the presence of a peroxide polymerization catalyst a mixture consisting of from 45 to 85 per cent by weight of acrylonitrile, from 8 to 20 per cent by weight of fumaric acid, and from 5 to 30 per cent by weight of methyl acrylate.

11. A process for preparing a ternary interpolymer comprising polymerizing in the presence of a peroxide polymerization catalyst a mixture consisting of from 45 to 85 per cent by weight of acrylonitrile, from 8 to 20 per cent by weight of fumaric acid, and from 5 to 30 per cent by weight of vinyl acetate.

12. A process for preparing a ternary interpolymer comprising polymerizing in the presence of a persulfate polymerization catalyst a mixture consisting of from 45 to 85 per cent by weight of acrylonitrile, from 8 to 20 per cent by weight of fumaric acid, and from 5 to 30 per cent by weight of methyl acrylate.

13. A process for preparing a ternary interpolymer comprising polymerizing in the presence of a persulfate polymerization catalyst a mixture consisting of from 45 to 85 per cent by weight of acrylonitrile, from 8 to 20 per cent by weight of fumaric acid, and from 5 to 30 per cent by weight of vinyl acetate.

JOHN R. CALDWELL.

No references cited.